United States Patent [19]

Ostermann

[11] Patent Number: 4,703,772
[45] Date of Patent: Nov. 3, 1987

[54] DISK VALVE FOR A RECIPROCATING COMPRESSOR

[75] Inventor: Erwin Ostermann, Zurich, Switzerland

[73] Assignee: Sulzer Brothers Limited, Winterthur, Switzerland

[21] Appl. No.: 937,987

[22] Filed: Dec. 4, 1986

[30] Foreign Application Priority Data

Dec. 9, 1985 [CH] Switzerland ............... 05247/85

[51] Int. Cl.⁴ ............................................. F16K 15/08
[52] U.S. Cl. ................................................. 137/516.21
[58] Field of Search ............... 137/516.13, 516.15, 137/516.17, 516.19, 516.21, 516.23

[56] References Cited

U.S. PATENT DOCUMENTS

| 1,695,069 | 12/1928 | Tuttle | 137/516.13 |
| 2,186,489 | 1/1940 | Kehler | 137/516.13 |
| 3,310,066 | 3/1967 | Kehler | 137/516.13 |
| 3,703,912 | 11/1972 | Bauer | 137/516.13 X |

Primary Examiner—Robert G. Nilson
Attorney, Agent, or Firm—Kenyon & Kenyon

[57] ABSTRACT

The disk valve employs a conventional valve seat and valve disk arrangement in which the perforations of the valve disk are offset from the perforations of the valve seat. A retainer having venturi-shaped openings is used to reduce flow losses due to eddying of kinetic energy. The valve disk perforations are also formed with flow cross-sections which are greater than the minimum flow cross-section of the aligned retainer openings.

14 Claims, 8 Drawing Figures

DISK VALVE FOR A RECIPROCATING COMPRESSOR

This invention relates to a disk valve for a reciprocating compressor.

As is known, various types of valves have been used for the delivery of a flowable medium such as a gas to reciprocating compressors. For example, one known disk valve employs a valve seat which is secured in a compressor casing, a retainer which is secured to the valve seat in spaced relation and a valve disk which is movable between the valve seat and the retainer in order to control a flow of the medium from the valve seat through the retainer. To this end, the valve seat and the valve disk have been provided with perforations which are offset from one another while the retainer is formed with perforations which register with the valve disk perforations. When the valve disk is abutted against the valve seat, the perforations in the valve seat are blocked so that medium cannot flow through. However, when the valve disk is moved away from the valve seat towards the retainer, the perforations in the valve seat are opened to communication with the perforations in the valve disk and retainer so that throughflow occurs.

In the known valves of the above type, the retainer perforations have had entry side boundary surfaces which extend for some distance parallel to the axis of the valve and then widen conically towards the exit side of the retainer. Thus, an edge occurs at the transition from the part extending parallel to the valve axis to the conically widening part of the boundary surfaces. On the other hand, the perforations in the valve disk are bounded by surfaces which extend parallel to the valve axis with the flow cross-sections of these perforations equal to the cross-section at the entry end of the retainer perforations. Thus, since the gas flow is deflected twice at the transition from the valve seat to the valve disk before entering the retainer perforations, the gas flow detaches from the boundary surfaces of both the valve disk perforations and the retainer perforations because the second deflection occurs on a sharp edge at the entry into the valve disk perforations. This detachment, in turn, increases flow losses due to eddying of kinetic energy at the retainer exit.

Accordingly, it is an object of the invention to improve the construction of a disk valve for a reciprocating compressor.

It is another object of the invention to reduce the flow losses of a disk valve during operation.

It is another object of the invention to provide a relatively simple structure for reducing the flow losses through a disk valve.

Briefly, the invention provides a disk valve which is constructed with a casing, a valve seat in the casing, a retainer coaxially spaced from the valve seat and a valve disk movably mounted coaxially between the valve seat and the retainer. The valve seat is provided with a plurality of perforations for a throughflow while the retainer is provided with a plurality of venturi-shaped openings disposed in offset relation with the perforations of the valve seat. In addition, the valve disk has a plurality of perforations disposed in offset relation to the perforations of the valve seat and in alignment with the openings of the retainer. Further, each valve disk perforation has a flow cross-section greater than a minimum flow cross-section of an aligned retainer opening.

The length of the venturi-like openings in the retainer are also greater than the length of the perforations of previously known retainers.

The flow cross-section in the retainer is thus made smaller than the flow cross-section in the valve disk. Hence, at the second deflection of a gas flow, that is, after detachment of the flow on the entry edges of the valve disk upon entry into the perforations thereof, the gas flow, with effect from entry into the corresponding retainer opening, is in contact with the venturi-like boundary surface. As a result, there is a reduction in the size of the detachment area. Secondly, the diffusor-like widening of each venturi-shaped opening operates more efficiently, that is, more kinetic energy is converted into pressure energy in the widening. This occurrence is greatly aided by the increased length of the diffusor.

The range in which the ratio of the minimum flow cross-section in a retainer opening can vary relative to the flow cross-section in the registering valve disk perforation is from 0.6 to 0.8.

These and other objects and advantages of the invention will become more apparent from the following detailed description taken in conjunction with the accompanying drawings wherein.

Figure 1:
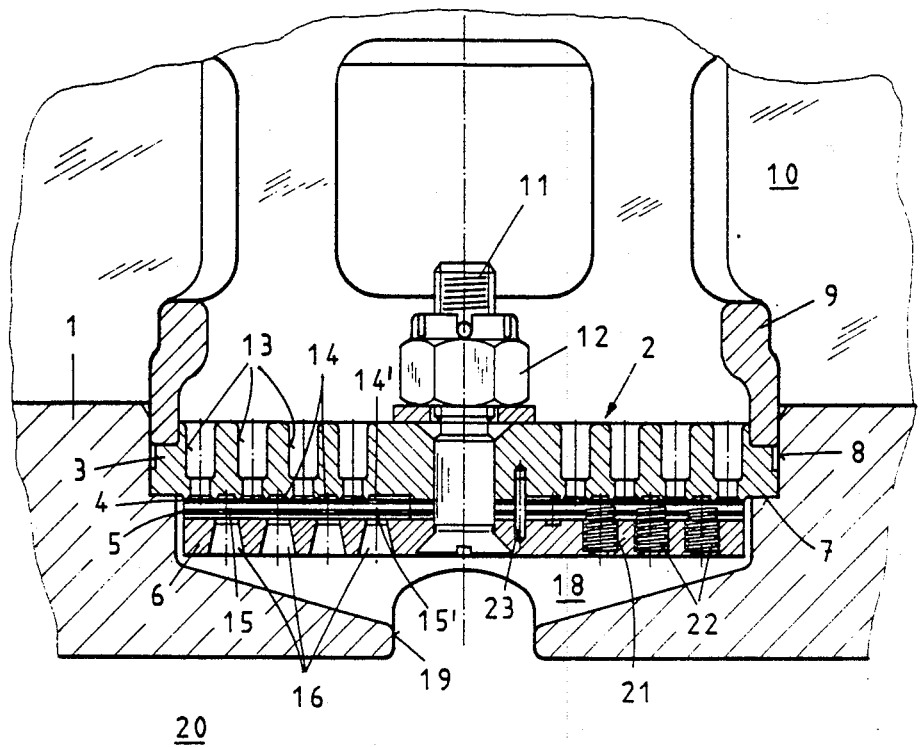
FIG. 1 illustrates a cross-sectional axial view of a prior art disk type inlet valve.

Referring to FIG. 1, the inlet valve 2 mainly comprises a disk-like valve seat 3, a valve disk 4, a damper disk 5 and a disk-like retainer 6 disposed in a casing 1 of a compressor cylinder which is not shown in further detail. The valve seat 3 is carried by way of the outer edge on a shoulder 7 of a bore 8 in the casing 1 and is secured in the bore by means of a cage 9 which is pressed onto the valve seat edge from an inlet duct 10. A central screw 11 associated with a nut 12 secures the retainer 6 to the valve seat 3, a space being present between the valve seat 3 and retainer 6 for the moving valve disk 4 and the damper disk 5. A pin 23 extends into an axial blind bore in the valve seat 3 and into an axial blind bore in the retainer 6 and extends through a registering bore in the valve disk 4 and damper disk 5. The pin 23 prevents the four disk-like parts from turning relative to one another.

The valve seat 3, in this example, is formed on four different radii with perforations 13 which extend in the peripheral direction and whose pattern is interrupted at a number of places by radial webs. These webs also interconnect the ribs between the perforations.

The valve disk 4 is formed between every two adjacent annular rows of perforations 13 with perforations 14 which extend parallel to the perforations 13. The valve disk 4 is formed inside the innermost perforation 13 with a corresponding perforation 14' which also extends parallel to the innermost perforation 13 and whose flow cross-section is approximately half that of the other perforations 14. The surfaces which bound the perforations 14 and 14' extend parallel to the valve axis.

The damper disk 5 is formed with perforations 15, 15' which register with the perforations 14, 14' respectively and are of the same size and shape as the perforations 14, 14' respectively.

The retainer 6 is formed with perforations 16 which register with the perforations 14, 14' and 15, 15' and whose boundary surfaces extend initially parallel to the valve axis for some distance, then widen in the fashion of a rectilinear cone. Near those boundary surfaces of the perforations 16 which extend parallel to the valve axis, the perforations 16 have the same flow cross-section as the perforations 14, 15 registering with them.

The perforations 13, 14, 14', 15, 15', 16 are flowed through by a gas which inflows through the inlet duct 10 and which, after exiting from the perforations 16, collects in a chamber 18 or nest disposed below the retainer 6 and bounded by the casing 1. The chamber 18 communicates by way of a central duct 19 with compressor cylinder chamber 20 which is not shown in further detail.

As can also be gathered from FIG. 1, the retainer 6 is formed not only with the perforations 16 but with bores 21, each receiving a helical spring 22. The springs 22 extend through the damper disk 5 and engage the valve disk 4 to bias the closing movement of the valve disk 4 on the compression stroke and during expulsion of the compressed gas. However, on the inlet stroke, the gas flow forces move the valve disk 4 towards the damper disk 5 against the force of the springs 22 to allow the gas, as previously mentioned, to flow through the perforations in the four disks. The gas flow thus experiences two sharp right-angled deflections from the perforations 13 to the perforations 14, 14'. The gas flow experiences another but less sharp deflection at the transition to the chamber 18.

The inlet valve construction hereinbefore described is basically the same for a delivery valve—i.e., with the valve components (valve seat, valve disk, damper disk and retainer) arranged in the same order in respect of the flow. However, the delivery valve is so mounted in the casing 1 as to open on the compression stroke, the flow direction being the converse of the flow direction associated with the inlet stroke. The valve seat clamped between the shoulder 7 and cage 9 is therefore adjacent the chamber 18 in a delivery valve and a retainer 6 extends into the cage space, the cage extending into the delivery duct.

Figure 2:
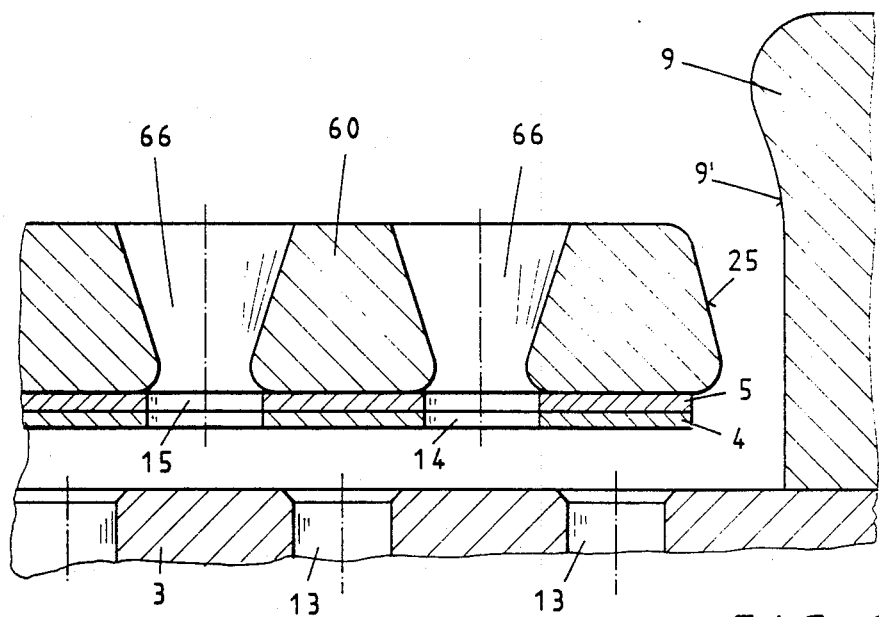
FIG. 2 illustrates an axial sectional view through a part of a disk valve constructed in accordance with the invention.

Referring to FIG. 2, wherein like reference characters indicate like parts as above, the disk valve which is constructed as a delivery valve employs a valve seat 3 with perforations 13 for a throughflow of gas as above. In addition, a valve disk 4 and a damper disk 5 having respective perforations 14, 15, are also provided with the perforations 14, 15 disposed in offset relation to the perforations 13 of the valve seat 3. However, in this case, a retainer 60 which is coaxially spaced from the valve seat 3 has a plurality of venturi-shaped openings 66 which are disposed in offset relation with the perforations 13 of the valve seat while being disposed in alignment with the opeings 14, 15 of the valve disk 4 and damper disk 5.

As illustrated, the retainer openings 66 each have boundary surfaces which extend in rounded or circular manner from the inlet end of said opening to a minimum flow cross-section and from the minimum flow cross-section to the outlet end of said opening, in stepless manner, for example, widen in a diffusor-like manner. Further, the valve disk perforations 14 and damper disk perforations 15 which are of equal size have a flow cross-section greater than the minimum flow cross-section of an aligned retainer opening 66.

The retainer 60 also has an outer peripheral surface 25 which defines an annular gap with a surface 9' of the casing 9. As indicated, the gap has an entry which narrows to a minimum cross-section and an outlet which extends from the minimum cross-section in a widening diffusor-like manner. An important consideration in this regard is that the outer diameter of each of the valve disk 4 and of the damper disk 5 is smaller than the maximum of diameter of the retainer 60.

The shaping of the retainer 60 and the corresponding dimensioning of the diffusor portions of the openings 66 and the diffusor portions between the retainer surface 25 and casing surface 9' as well as the dimensioning of the perforations 14, 15 serve to reduce the gas flow losses considerably as compared with the known valve construction illustrated, for example in FIG. 1. In this respect, the gas flow passing from the perforations 13 of the valve seat 3 and flowing into the perforations 14, 15, of the disks 4, 5, into the retainer openings 66 engages, after passing through the minimum cross-sections, with the widening boundary surfaces of the openings 66. In like regard, the gas flow experiences the same pattern in flowing through the annular gap between the boundary surfaces 25, 9'. Consequently, since flow detachments are inhibited, there is an increase of the transformation of kinetic energy of the gas into pressure energy in the venturi-shaped openings 66 and gap so that the valve losses are reduced overall.

Figure 3:
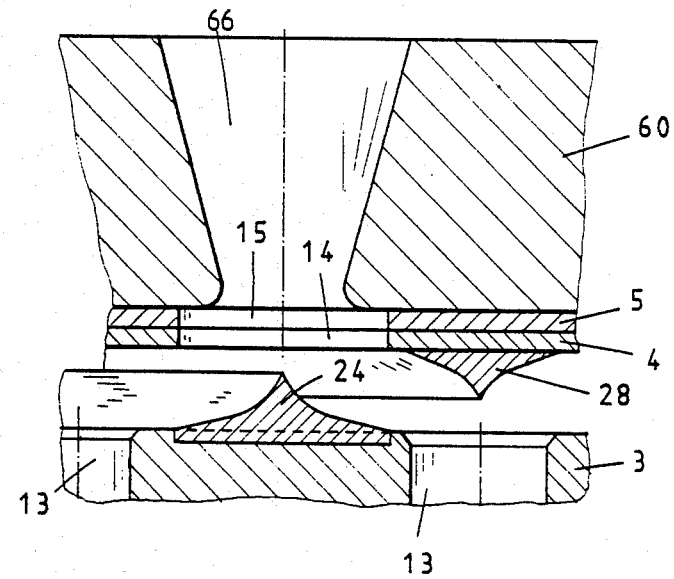
FIG. 3 illustrates a modified embodiment employing flow guiding member on the valve seat and valve disk of a disk valve constructed in accordance with the invention.

Referring to FIG. 3, wherein like reference characters indicate like parts as above, flow guiding members 24, 28 can be provided on the respective valve seat 3 and valve disk 4 for guiding the flow into the retainer openings 66. As indicated, the flow guiding member 24 on the valve seat 3 is shaped so as to narrow from the base on the valve seat 3 towards an aligned retainer opening 66. The narrowing boundary surfaces of the member 24 are concave and meet at an acute angle having a vertex which lies on the axis of the aligned opening 66. As indicated, the member 24 extends in the peripheral direction substantially over the same length as the associated opening 66.

The flow guiding member 28 on the valve disk 4 is disposed with a perforation 13 in the valve seat 3 and corresponds in shape to the flow guiding member 24. These flow guiding members 24, 28 enhance the tendency towards the reduced valve losses.

With the valve seat 3 and valve disk 4 having opposed plane surfaces, when the valve disk 4 is in a closed position, i.e. in engagement with the valve seat 3, the members 24, 28 extend into the aligned openings 14, 15, 66 and perforations 13, respectively.

The venturi-shaped opening 66 should be of a definite length in order to increase conversion of the kinetic energy of the gas into pressure energy. As illustrated in FIGS. 2 and 3, this requirement is obtained if the retainer 60 is thicker than in the valve shown in FIG. 1. However, the increased weight caused by the increased thickness of the retainer 60 may be a disadvantage. In order to obviate this disadvantage, the retainer 60 may be constructed in different fashion.

Figure 4:
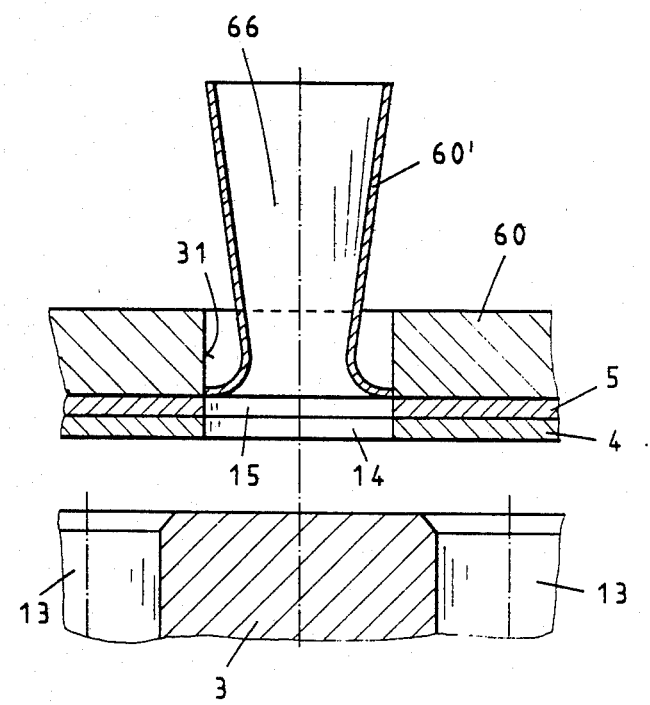
FIG. 4 illustrates a further modified retainer opening employing a shaped member to form a venturi-like retainer opening in accordance with the invention.

Referring to FIG. 4, the disk-like part of a retainer 60 is made of substantially the same thickness as in the known valve of FIG. 1 and is formed with perforations 31 each having boundary surfaces extending parallel to the longitudinal axis of the valve. In this case, the cross sectional dimensions of the perforations 31 are substantially the same as those of the perforations 14, 15 of the disks 4, 5. However, each retainer 60 is provided with a sheet metal diffusor 60' in order to define a venturi-shaped opening 66. As indicated, each diffusor 60' is secured within a perforation 31, for example, by welding at the entry end near the damper disk 5.

Figure 5:
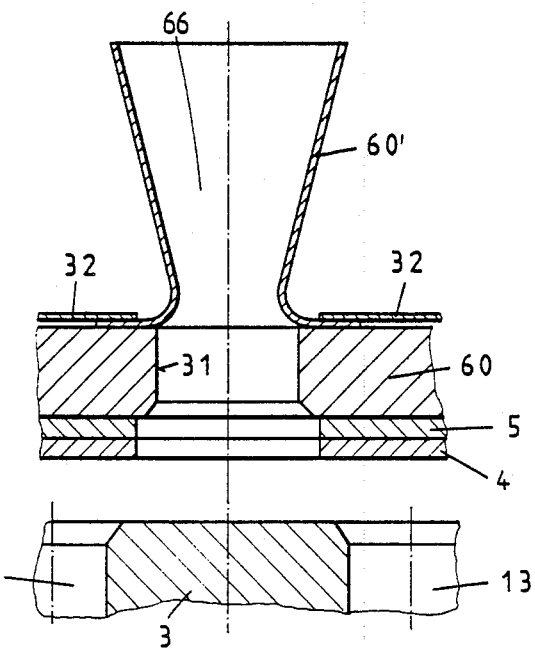
FIG. 5 illustrates a cross-sectional view of a structure similar to FIG. 4.

Alternatively, as shown in FIG. 5, the sheet metal diffusors 60' may be secured on the downstream side of the disk-like part of the retainer 60, i.e. remote from the damper disk 5. In this case, each diffusor 60' is secured in place by means of overlapping metal strips 32 which are secured in place, for example by screws (not shown) and which serve to press the diffusors 60' against the disk-like part of the retainer 60. A single strip 32 may be used to retain two adjacent diffusors 60' in place. Alternatively, instead of using the strips 32, a disk similar to the valve disk 4 may be used to retain the diffusors 60' in place.

When the above-described valves are used as inlet valves in a compressor, for example, when the gas issuing from the venturi-shaped openings 66 is deflected in the chamber 18, the valves are capable of further improvements which serve to reduce valve losses.

Figure 6:
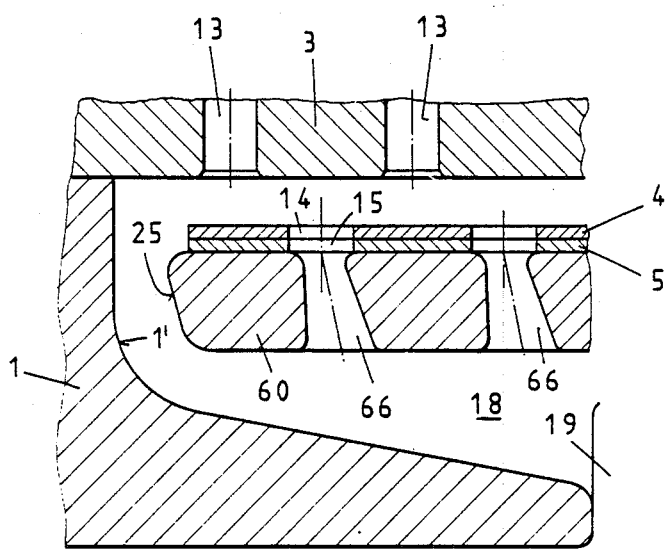
FIG. 6 illustrates a cross-sectional view of a retainer having modified retainer openings in accordance with the invention.

For example, as shown in FIG. 6, the retainer openings 66 are venturi-shape and each has an axis skewed so that the outlet is offset from the inlet towards the longitudinal axis of the valve. The advantage of this feature is that the gas issuing from the opening 66 already has a movement component towards the central duct 19. This serves to reduce the flow losses by deflection. Further, the annular gap between the peripheral surface 25 of the retainer 60 and the boundary surface 1' of the casing 1 is venturi-shaped. Thereafter, the boundary surface 1' is so shaped that the flow cross-section increases continuously as far as the adjacent retainer opening 66.

Figure 7:
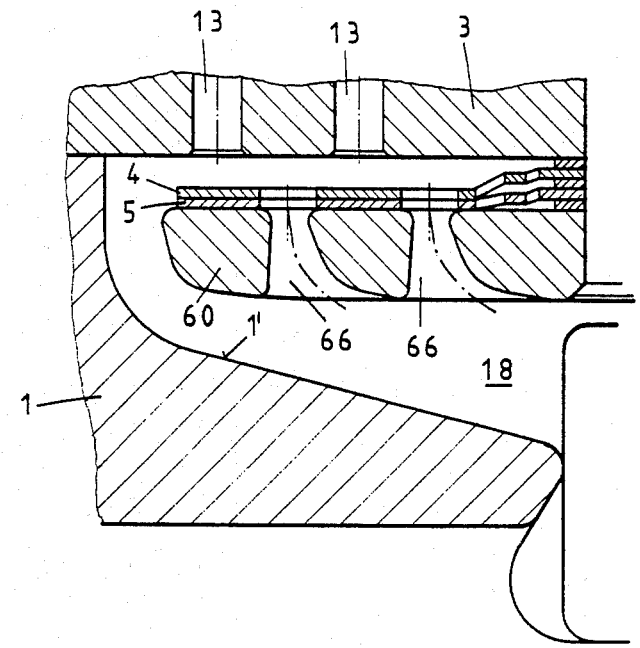
FIG. 7 illustrates a further modified retainer having retainer openings of varying shape.

Referring to FIG. 7, the outlet cross-sections of the retainer opening 66 may also widen towards the valve axis so that the outlet cross-sections of two adjacent openings almost merge into one another. The gas issuing from these openings 66 therefore flow substantially parallel to the casing surface 1' bounding the chamber 18. The dimensioning of the flow cross-sections is such that the effective cross-sections increase slightly in the flow direction.

Figure 8:
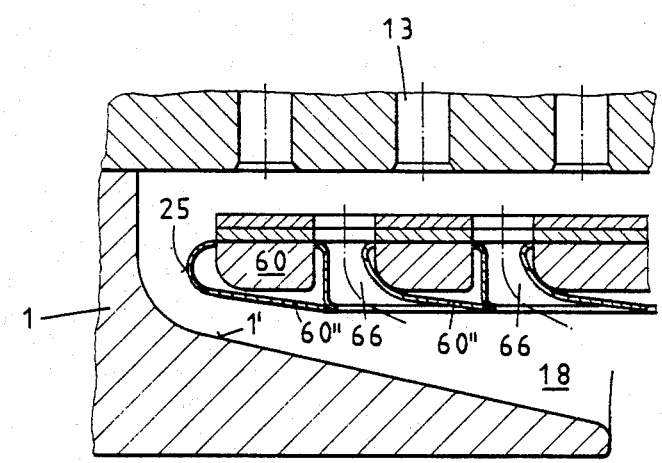
FIG. 8 illustrates a cross sectional view of a retainer employing separate members to form retainer openings of venturi-shape.

Referring to FIG. 8 instead of forming the retainer opening 66 directly in the retainer 60, the opening 66 may be formed by shaped sheet metal members 60" secured to the disk-like part of the retainer 60, for example by soldering or welding. As illustrated, the outer contour of the outermost member 60" is operative as the boundary surface 25 of the annular gap which, as in FIGS. 6 and 7, cooperates with the adjacent part of the boundary surface 1' of the casing 1 to form a venturi-shaped flow duct.

The diffusors 60' shown in FIGS. 4 and 5 and the members 60" shown in FIG. 8 may be made of plastics or ceramic instead of sheet metal.

The invention thus provides a disk valve which inhibits flow detachments so that there is an increase in the transformation of the kinetic energy of a gas flowing through the valve into pressure energy so that valve losses are reduced.

The invention further provides a disk valve which can be constructed in relatively simple manner to obviate flow losses due to eddying of kinetic energy within the valve.

What is claimed is:

1. A disk valve for a reciprocating compressor comprising
a casing;
a valve seat in said casing having a plurality of perforations for a throughflow of a gas;
a retainer coaxially spaced from said valve seat and having a plurality of venturi-shaped openings therein disposed in off-set relation with said perforations of said valve seat, said retainer having a plane surface on an upstream side thereof; and
a valve disk movably mounted between said valve seat and said retainer and having a plane surface on a downstream side thereof, said valve disk having a plurality of perforations disposed in off-set relation to said perforations of said valve seat and in alignment with said openings of said retainer, each said disk perforation having a flow cross-section greater than a minimum flow cross-section of an aligned retainer opening whereby a gas flow detaching upon entry into a disk perforation engages the aligned retainer opening upon entry thereinto.

2. A disk valve as set forth in claim 1 wherein at least one of said retainer openings has boundary surfaces which extend in circular manner from the inlet end of said opening to said minimum flow cross-section and in stepless manner from said minimum flow cross-section to the outlet end of said opening.

3. A disk valve as set forth in claim 1 which further comprises flow guiding members on at least one of said valve seat and said valve disk for guiding flow therebetween into said retainer openings.

4. A disk valve as set forth in claim 1 wherein said retainer includes a plurality of sheet metal diffusers defining said venturi-shaped openings.

5. A disk valve as set forth in claim 1 wherein said retainer is a disk having an outer peripheral surface defining an annular gap with said casing, said gap having an entry narrowing to a minimum cross-section and an outlet extending from said minimum cross-section in a widening diffusor-like manner.

6. A disk valve as set forth in claim 1 wherein at least one of said retainer openings has an inlet and an outlet offset from said inlet towards a longitudinal axis of the valve.

7. A disk valve comprising
a casing;
a valve seat in said casing having a plurality of perforations for a throughflow;
a retainer coaxially spaced from said valve seat and having a plurality of venturi-shaped openings disposed in offset relation with said perforations of said valve seat; and
a valve disk movably mounted coaxially between said valve seat and said retainer and having a plurality of perforations disposed in off-set relation to said perforations of said valve seat and in alignment with said openings of said retainer, each disc perforation having a flow cross-section greater than a minimum flow cross-section of an aligned retainer opening.

8. A valve disk as set forth in claim 7 wherein each said retainer opening has boundary surfaces which extend in circular manner from the inlet of said opening, to said minimum flow cross-section and in stepless manner, from said minimum flow cross-section to the outlet end of said opening.

9. A valve disk as set forth in claim 8 which further comprises flow guiding members on at least one of said valve seat and said valve disk for guiding flow therebetween into said retainer openings.

10. A valve disk as set forth in claim 7 wherein said retainer includes a plurality of sheet metal diffusers defining said venturi-shaped openings.

11. A valve disk as set forth in claim 7 wherein said retainer is a disk having an outer peripheral surface defining an annular gap with said casing, said gap having an entry narrowing to a minimum cross-section and an outlet extending from said minimum cross-section in a widening diffusor-like manner.

12. A valve disk as set forth in claim 7 wherein each retainer opening has an inlet and an outlet offset from said inlet towards a longitudinal axis of the valve.

13. A valve disk as set forth in claim 7 wherein said retainer is fixedly mounted relative to said valve seat and said valve disk is movable axially between said retainer and said valve seat.

14. A valve disk as set forth in claim 13 wherein said valve disk is mounted on said retainer and biased against said valve seat to move therefrom in response to a flow through said perforations of said valve seat.

* * * * *

UNITED STATES PATENT AND TRADEMARK OFFICE
CERTIFICATE OF CORRECTION

PATENT NO. : 4,703,772

DATED : November 3, 1987

INVENTOR(S) : ERWIN OSTERMANN

It is certified that error appears in the above-identified patent and that said Letters Patent is hereby corrected as shown below:

In the front page, change "Assignee: Sulzer Brothers Limited, Winterthur, Switzerland" to --Assignee: Maschinenfabrik Sulzer-Burckhardt AG, Basel, Switzerland- Signed and Sealed this Fifth Day of March, 1991

Attest:

HARRY F. MANBECK, JR.

Attesting Officer

Commissioner of Patents and Trademarks